(12) United States Patent
Anderson et al.

(10) Patent No.: US 11,282,350 B2
(45) Date of Patent: Mar. 22, 2022

(54) FIREARM DISCHARGE DETECTING AND SEMAPHORING SYSTEM AND METHOD

(71) Applicant: AVIDEA GROUP, INC., Melbourne, FL (US)

(72) Inventors: Michael Anderson, Orlando, FL (US); Ada Anderson, Palm Bay, FL (US); Neil Grosse, Melbourne, FL (US); Jay R. Ver Hulst, Clearwater Beach, FL (US)

(73) Assignee: AVIDEA GROUP, INC., Melbourne, FL (US)

( * ) Notice: Subject to any disclaimer, the term of this patent is extended or adjusted under 35 U.S.C. 154(b) by 0 days.

(21) Appl. No.: 16/911,424

(22) Filed: Jun. 25, 2020

(65) Prior Publication Data

US 2021/0012629 A1 Jan. 14, 2021

Related U.S. Application Data

(60) Provisional application No. 62/866,265, filed on Jun. 25, 2019.

(51) Int. Cl.
| | |
|---|---|
| *G08B 7/06* | (2006.01) |
| *G06F 3/16* | (2006.01) |
| *H04N 5/33* | (2006.01) |
| *G01J 5/00* | (2022.01) |
| *G01K 13/00* | (2021.01) |

(52) U.S. Cl.
CPC ............ *G08B 7/066* (2013.01); *G01J 5/0018* (2013.01); *G01J 5/0066* (2013.01); *G01K 13/00* (2013.01); *G06F 3/165* (2013.01); *G08B 7/062* (2013.01); *H04N 5/33* (2013.01)

(58) Field of Classification Search
None
See application file for complete search history.

(56) References Cited

U.S. PATENT DOCUMENTS

| | | | | | |
|---|---|---|---|---|---|
| 5,428,912 | A | * | 7/1995 | Grondal | G02B 6/0055 362/800 |
| 5,448,843 | A | * | 9/1995 | Schwartz | G09F 13/14 40/570 |
| 5,659,287 | A | * | 8/1997 | Donati | G08B 7/06 315/292 |
| 5,931,573 | A | * | 8/1999 | Knox | B60Q 1/2611 362/493 |
| 6,025,773 | A | * | 2/2000 | Bresnan | G08B 6/00 116/205 |
| 6,150,943 | A | * | 11/2000 | Lehman | G08B 7/062 340/332 |
| 2002/0057204 | A1 | * | 5/2002 | Bligh | G09F 19/22 340/691.1 |
| 2004/0075572 | A1 | * | 4/2004 | Buschmann | G08B 7/062 340/691.1 |
| 2005/0128097 | A1 | * | 6/2005 | Piccolo, III | G08B 7/06 340/691.1 |
| 2005/0286247 | A1 | * | 12/2005 | Peterson | F21S 4/24 362/249.01 |

(Continued)

*Primary Examiner* — Curtis J King
(74) *Attorney, Agent, or Firm* — Trueba & Suarez PLLC; Roberto M. Suarez; William R. Trueba, Jr.

(57) ABSTRACT

A semaphore for guiding an occupant to safety during an emergency event communicates with a gunfire detector to provide a visual cue conveying whether it is safe to proceed through an entryway in an active shooter event.

10 Claims, 5 Drawing Sheets

100

(56) References Cited

U.S. PATENT DOCUMENTS

| | | | |
|---|---|---|---|
| 2007/0069882 A1* | 3/2007 | Mahajan | G08B 7/062 340/500 |
| 2007/0132575 A1* | 6/2007 | Ellul | G08B 5/38 340/524 |
| 2009/0059602 A1* | 3/2009 | Santos | G08B 5/36 362/351 |
| 2009/0151210 A1* | 6/2009 | Nagatome | G09F 19/22 40/541 |
| 2010/0013658 A1* | 1/2010 | Chen | G08B 7/062 340/815.4 |
| 2010/0019901 A1* | 1/2010 | Tsai | G08B 7/066 340/540 |
| 2010/0207777 A1* | 8/2010 | Woodford | G08B 5/38 340/815.45 |
| 2012/0038479 A1* | 2/2012 | Ten Wolde | H05B 31/50 340/540 |
| 2012/0319860 A1* | 12/2012 | Savage, Jr. | G08B 7/06 340/691.8 |
| 2013/0049985 A1* | 2/2013 | Eisenson | G08G 1/0965 340/902 |
| 2014/0132183 A1* | 5/2014 | Van Herpen | G08B 7/066 315/297 |
| 2014/0139539 A1* | 5/2014 | Byers | G09G 5/10 345/589 |
| 2015/0070166 A1* | 3/2015 | Boyden | G08B 13/1672 340/540 |
| 2016/0035201 A1* | 2/2016 | Savage, Jr. | G08B 17/06 340/815.45 |
| 2016/0140823 A1* | 5/2016 | Park | G08B 17/113 340/628 |
| 2018/0204429 A1* | 7/2018 | Savage, Jr. | G08B 7/066 |
| 2019/0295386 A1* | 9/2019 | Roberts | H02J 9/065 |
| 2020/0372768 A1* | 11/2020 | Armpriester | H04L 67/12 |

\* cited by examiner

Direction of Safe Travel

310

Direction of Safe Travel

310

Direction of Safe Travel

No direction safe

310

Direction of Safe Travel

FIREARM DISCHARGE DETECTING AND SEMAPHORING SYSTEM AND METHOD

CROSS-REFERENCE TO RELATED APPLICATIONS

This application is a non-provisional of, and claims priority to, provisional patent application No. 62/866,265, filed on Jun. 25, 2019, entitled "Firearm Discharge Detecting and Semaphoring System and Method," which is incorporated by reference herein.

FIELD OF THE INVENTION

The invention disclosed broadly relates to the field of electrical and electronic devices and sensors, and more particularly relates to a firearm discharge detection solution that includes in situ detectors, cloud-based machine learning, a semaphoring or audio system and method.

BACKGROUND OF THE INVENTION

Gunfire detection systems are no longer limited to military use. In the United States and in Europe, we are beginning to see widespread use of gunfire detection systems in hospitals, schools, government buildings, and sports complexes. As is seen in some of these systems, it can take up to one minute or more between the time a shot is detected to when police are notified because human intervention is required to interpret the sensor output. When lives are in the balance, one minute is too long. To address this problem, newer systems have been developed that employ high-tech devices using auditory sensors coupled with processors to detect and identify gunfire. The drawback to these systems is that the deployed devices evaluate the sensor data at the site. This makes the devices costly and the computational burden is a power drain. Therefore, there is a need for a gunfire detection system that is both cost-efficient and accurate.

In addition, a need exists for automation of the process of determining and communicating evacuation routes to safe zones during an emergency. In the event of an emergency, pre-planned evacuation methods and procedures are established in many schools, hospitals, government buildings, sports complexes, and other populated buildings. In accordance with such methods and procedures, drills are routinely conducted to familiarize the occupants of the building with routes leading to safety or evacuation. Such pre-planned safety and evacuation routes may not be effective in certain situations, for example, when an active shooter is in the building.

In a firearm discharge scenario, many emergency plans include instructions for the occupants to (i) if it is safe, escape or evacuate, or (ii) if it is not safe, to hide. As such, when faced with an active shooter emergency, occupants of a building must first determine whether it is safe to evacuate, and then must determine the safest path for evacuation, as applicable. An occupant must make such critical determinations during a time in which the occupant is under extreme stress.

Additionally, if gunfire has been detected, the occupants may not know where the gunfire originated, whether there is more than one location of origin, or the proximity of the gunfire. Given that occupants may not be able to function rationally under extreme stress, a guide for occupants to follow during an emergency, rather than relying on memory, may save lives. Therefore, there is a need for an automated system to determine whether it is safe to evacuate, and to determine and communicate the safest evacuation path or route to the occupant.

SUMMARY

In view of the foregoing, a preferred embodiment of the present invention is directed to a semaphoring system configured to interface with a firearm discharge detection system to form a combined firearm discharge detecting and semaphoring system. It is important to note that the system and method of the present invention may also be useful in directing occupants away from a fire or other emergency, depending upon the parameters and sensors utilized by the firearm discharge detection system. By way of example, some firearm discharge detection systems utilize infrared sensors to detect the source of the heat generated by a firearm, which is also useful to detect the heat generated by a fire. The semaphoring system of the present invention may consist of flags, lights, mechanically moving arms, or other semaphores having the primary function of providing a visual signal to an occupant indicating which direction to follow to safety. It is contemplated that under the correct physical and spatial circumstances other semaphoring devices may also be employed, such as using an audio warning and/or an audio instruction. Within the semaphoring system, semaphoring devices, as is known in the art, such as, inter alia, devices with lights, are placed over doors or in hallways. In the event of an emergency requiring evacuation, the semaphoring system receives a communication via wireless communication protocols (such as, but not limited to, Wi-Fi or Bluetooth) from the firearm discharge detection system.

The present invention contemplates that the devices herein also communicate with servers and computer systems to access algorithms designed to calculate safe paths and control indicators. In the preferred embodiment, the semaphore system then activates, whereby the semaphores provide a visual signal to the occupants. For example, semaphoring lights will turn red or green, depending on whether it is safe to evacuate or move in a certain direction, ultimately guiding occupants away from danger and to a safe zone or evacuation route.

In other embodiments, the semaphoring system is configured to interface with a fire detection system to form a combined fire detecting and semaphoring system. An advantage of the present invention is that it is also effective in the event of a fire. From a practical standpoint, in a school environment, an active shooter drill conducted using the present invention could be accomplished concurrently with, and emphasized as, a fire drill. Fire drills, as compared to active shooter drills, have less of an emotional impact on students. Using the present invention, in the context of a drill, the emergency—whether it is a fire or active gun shooter—becomes less relevant because the emphasis is on following a guide through semaphores to safety.

In further embodiments, the semaphoring system can be configured to interface with any type of detection system to form a combined detection and semaphoring system.

Furthermore, each of the devices of the firearm discharge detecting and semaphoring system can be configured to interface with third-party systems such as cameras, video cameras, fire sprinklers, alarms, and the like. Embodiments of the system are further configured to wirelessly interface with smart-speakers or other smart devices, as is known in the art, thereby having the ability to be controlled via said smart-speakers, by voice control, or other smart devices. Yet further embodiments of the invention include devices that are able to interface or communicate with an audio system, with said audio system providing audio instructions to the occupants in addition to the visual signals provided by the semaphoring system.

BRIEF DESCRIPTION OF THE DRAWINGS

To describe the foregoing and other exemplary purposes, aspects, and advantages, we use the following detailed description of an exemplary embodiment of the disclosure with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but to the contrary, the intention is to cover all modifications, equivalents and alternatives falling within the scope of the present disclosure.

DETAILED DESCRIPTION

In the Summary above, in the Description below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Firearm Discharge Detecting and Semaphoring System

The firearm discharge detecting and semaphoring system in the present invention addresses the above-stated need for an automated system to determine whether it is safe for an occupant to evacuate or move to a safe zone, and to further determine the evacuation or safe zone route in a building in the event of a detected firearm discharge or other emergency such as fire.

Figure 1:
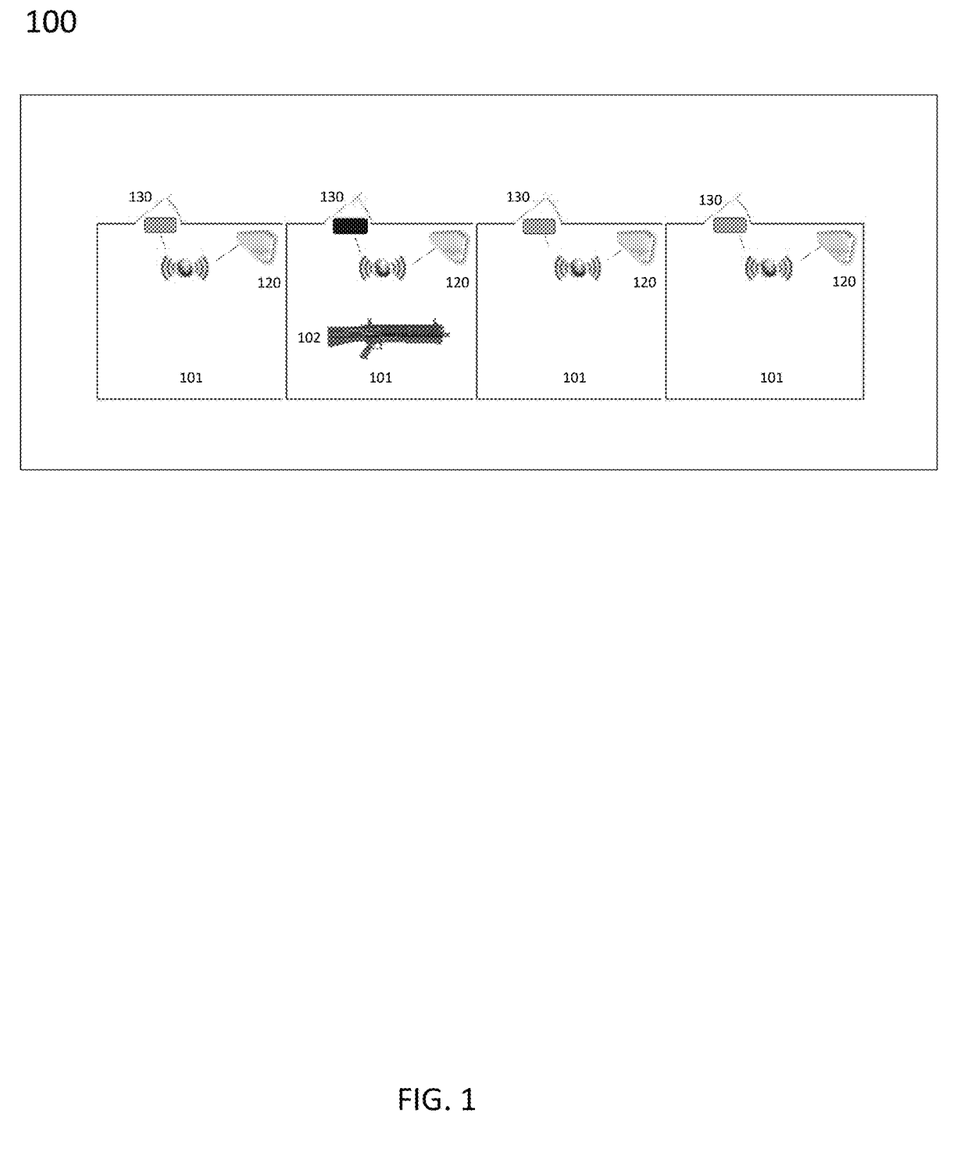
FIG. 1 shows an illustration of an exemplary block diagram for a firearm discharge detection and semaphoring system, according to an embodiment of the present disclosure.

Referring now to FIG. 1, there is shown a simplified illustration of a firearm discharge detecting and semaphoring system 100, according to an embodiment of the present disclosure. The system of FIG. 1, by way of example only, is shown implemented in a school with several classrooms 101.

Although the invention described herein contemplates many devices, the following types of devices are described by way of example and not limitation. In the example of FIG. 1, at least one mono-directional semaphore 130 is deployed above the door on the outside of each separate classroom 101 in the building. "Mono-directional semaphore," as used herein, means that such semaphoring device displays one signal at a time. The example of FIG. 1 is not meant to limit the invention to use with only mono-directional semaphores.

Figure 2:
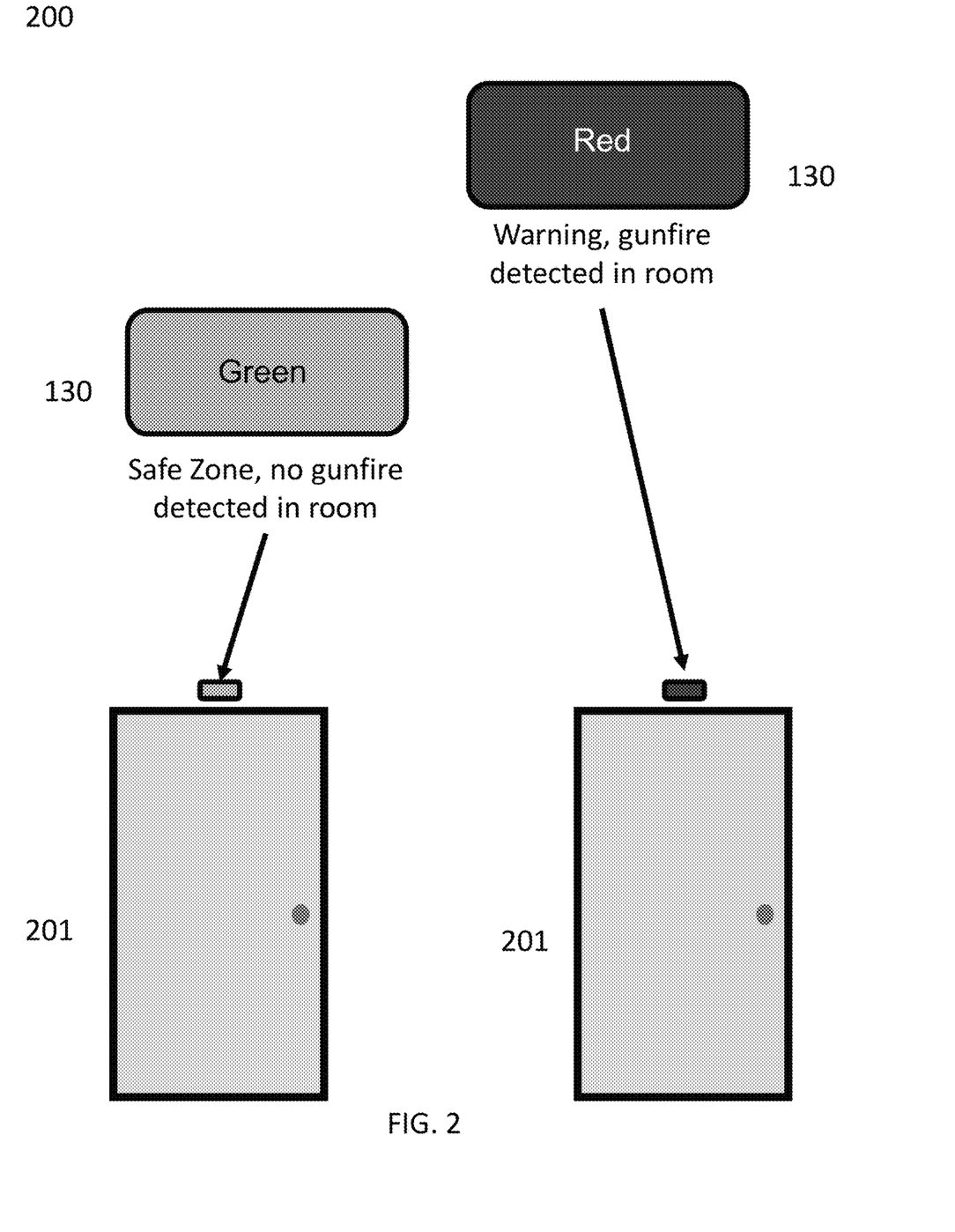
FIG. 2 shows an illustration of an exemplary semaphore attached to a wall and positioned above a door in a building.

FIG. 2 is a schematic showing the placement of the mono-directional semaphore 130 above a door 201. The semaphores 130, in this example, are devices having red and green lights indicating warning and safe zone, respectively.

The semaphores 130 are easily installed by affixing them to a structure, such as a wall, doorframe, ceiling or floor, by way of example only. The semaphores 130 can be affixed mechanically by application of, by way of example only, adhesive strips, screws, magnets, or other mechanical means.

Each of the semaphores 130 are shown in FIG. 1 in communication, by way of example only, via Bluetooth, with each of the firearm discharge detectors 120. In FIG. 1, each semaphore 130 receives communications from each firearm discharge detector 120 within its communication range. The semaphores 130 may also receive communications by other means, as is known in the art. As used herein, a data communication link means a connection established between two or more nodes (such as a semaphore and a firearm discharge detector) whereby data is transmitted and received between the two or more nodes. The data communication link may be accomplished, for example, via a wireless or wired network. The network may be a local area network (LAN) or a wide area network (WAN). The data communication link may run through one or more data routers and still be within the scope of the invention, or the data communication link may be a direct link between two nodes.

In the example of FIG. 1, when a firearm 102 is discharged, the firearm discharge detector 120 is in alert mode, and semaphores 130 in communication with that firearm discharge detector 120 signal a red light. If a firearm discharge detector 120 is not in alert mode, semaphores 130 in communication with that firearm discharge detector 120 signal a green light.

Each firearm discharge detector 120 has a temperature and infrared sensor which serve to also detect hotspots in the event of fire, in addition to the active shooter location. Therefore, the firearm discharge and semaphoric system 100 also works for purposes of fire detection, as well as other emergency detection, and safety routing. The invention herein is contemplated to include other emergency detection systems, and is not limited to firearm detection systems.

Figure 3:
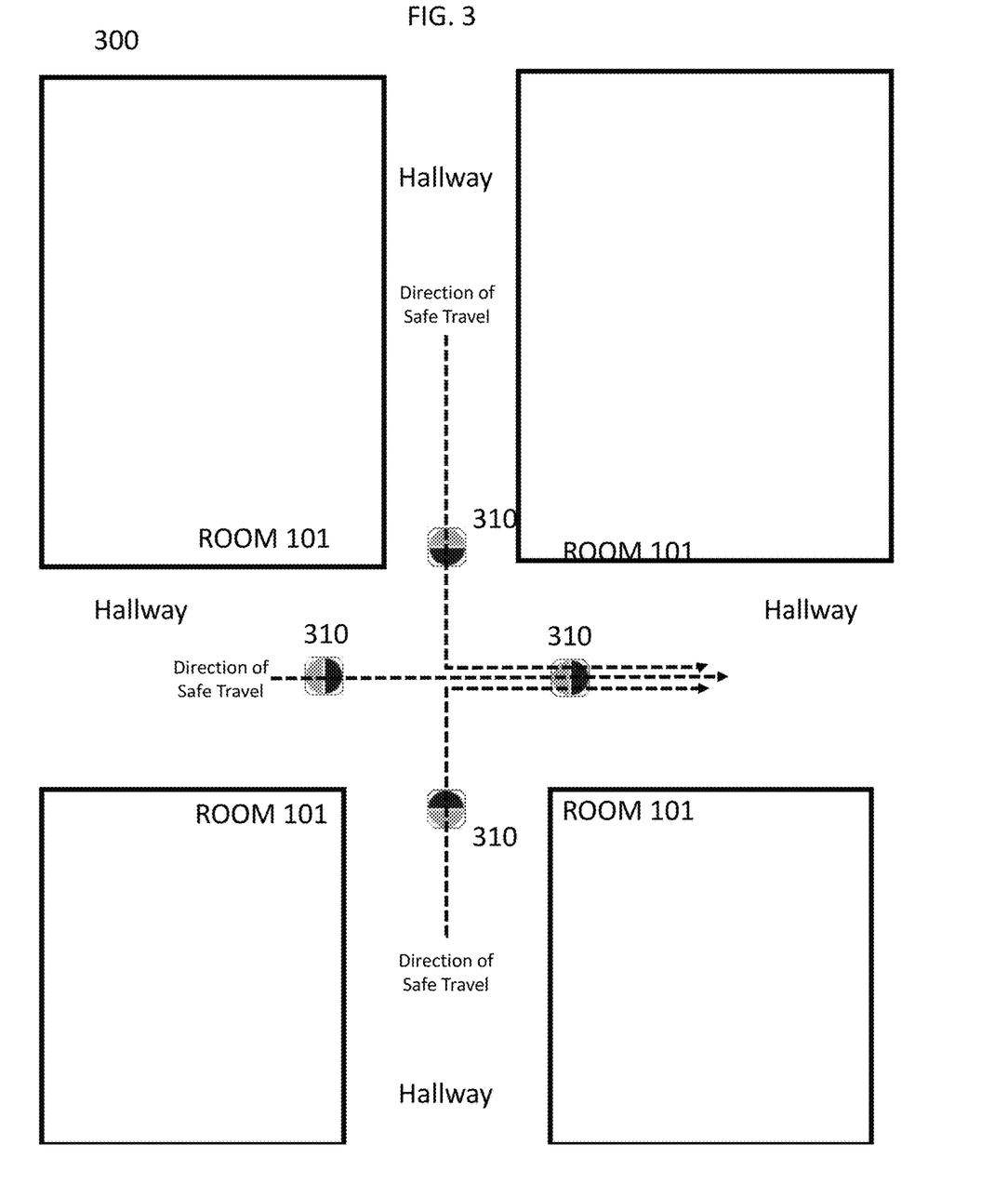
FIG. 3 shows an illustration of an exemplary block diagram for a firearm discharge detection and semaphoring system, according to another embodiment of the present disclosure.

Referring now to FIG. 3, there is shown a schematic of the firearm detection and semaphoring system, where the semaphores 310 are multi-directional semaphores, having red and green lights, and are shown as placed in intersecting hallways. "Multi-directional semaphore" means that the semaphoring device may simultaneously display the same or different signals in different directions. In the example of FIG. 3, the multi-directional semaphores further direct occupants in the building to safety. The dotted line arrows indicate the direction of safe travel in FIG. 3.

In FIG. 3, the multi-directional semaphores 310 are easily installed by affixing them to any structure, by way of example only, such as a wall, doorframe, ceiling or floor. The multi-directional semaphores 310 can be affixed mechanically by application of, by way of example only, adhesive strips, screws, magnets, or other mechanical means.

Figure 4:
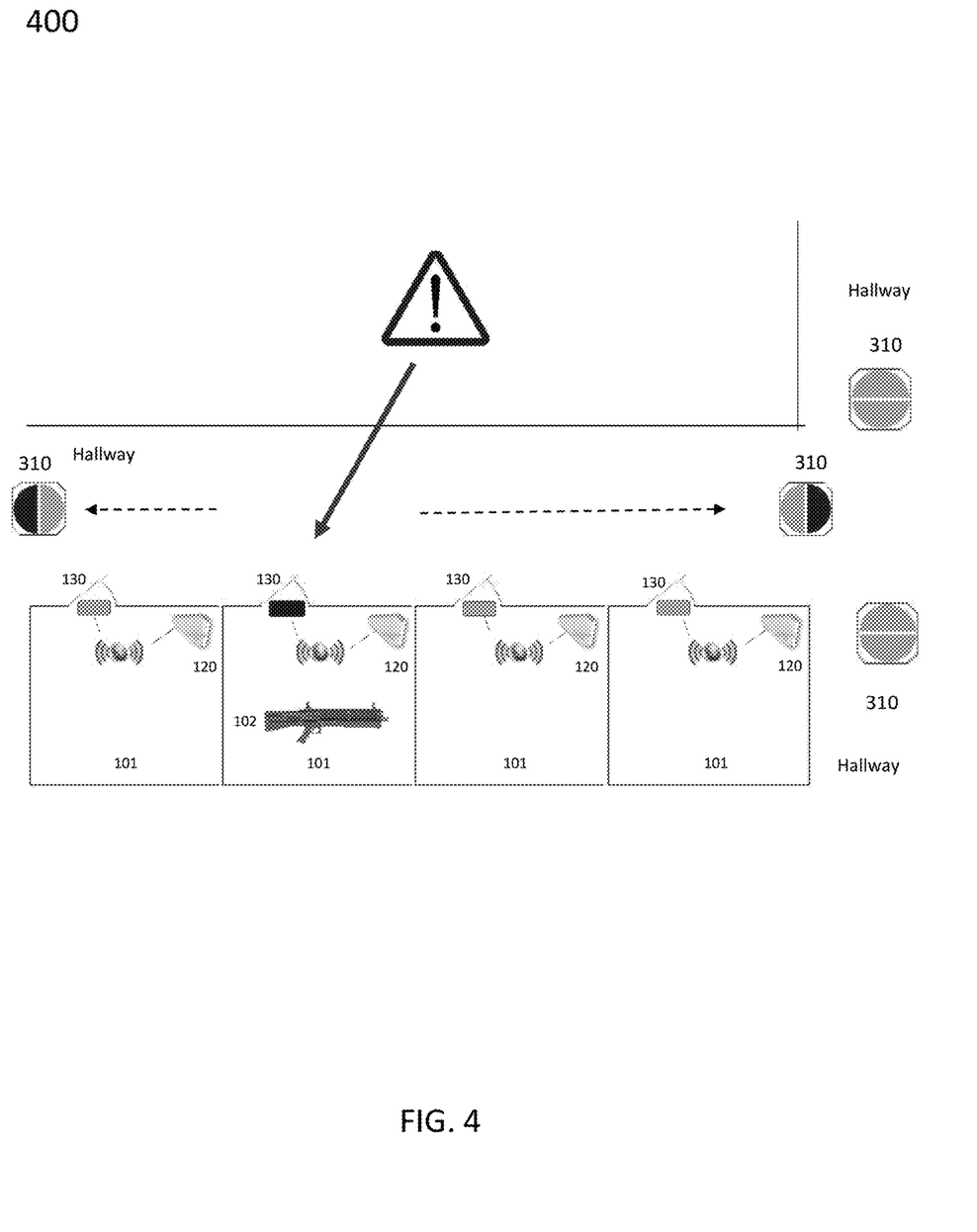
FIG. 4 shows an illustration of an exemplary block diagram for a firearm discharge detection and semaphoring system, according to another embodiment of the present disclosure.

Referring now to FIG. 4, there is shown an illustration of the firearm discharge detection and semaphoring system 100, where the mono-directional and multi-directional semaphores are configured to communicate with an emergency detection system and/or with each other. In the example of FIG. 4, at least one multi-directional semaphore 310 is deployed at the intersection of two hallways. Multi-directional semaphores 310 may also be placed anywhere within the hallway. In this example of FIG. 4, an emergency discharge detection system, such as a firearm discharge detection system, is deployed within the building. The firearm discharge detector 120, is shown in FIG. 4 for illustrative purposes only.

In the example of FIG. 4, when a firearm 102 is discharged, the firearm discharge detector 120 communicates with the mono-directional semaphores 130 and further communicates with the multi-directional semaphores 310. The mono-directional semaphores 130 could also communicate with the multi-directional semaphores 310. The semaphores 130, 310 may include logic and wireless communications systems that permit them to be programmed to communicate with each other to provide directional instructions to the individuals attempting to flee a dangerous condition. In addition to a centralized communications system, wireless networking systems incorporating a daisy chain network, mesh network, star network, or others, as known in the art, may be implemented in order to coordinate the correct signaling around the building or grounds. Similarly, the discharge detection system may have similar communications capabilities that would provide for a coordinated distribution of instructions to individuals within the building via the semaphores 130, 310.

Figure 5:
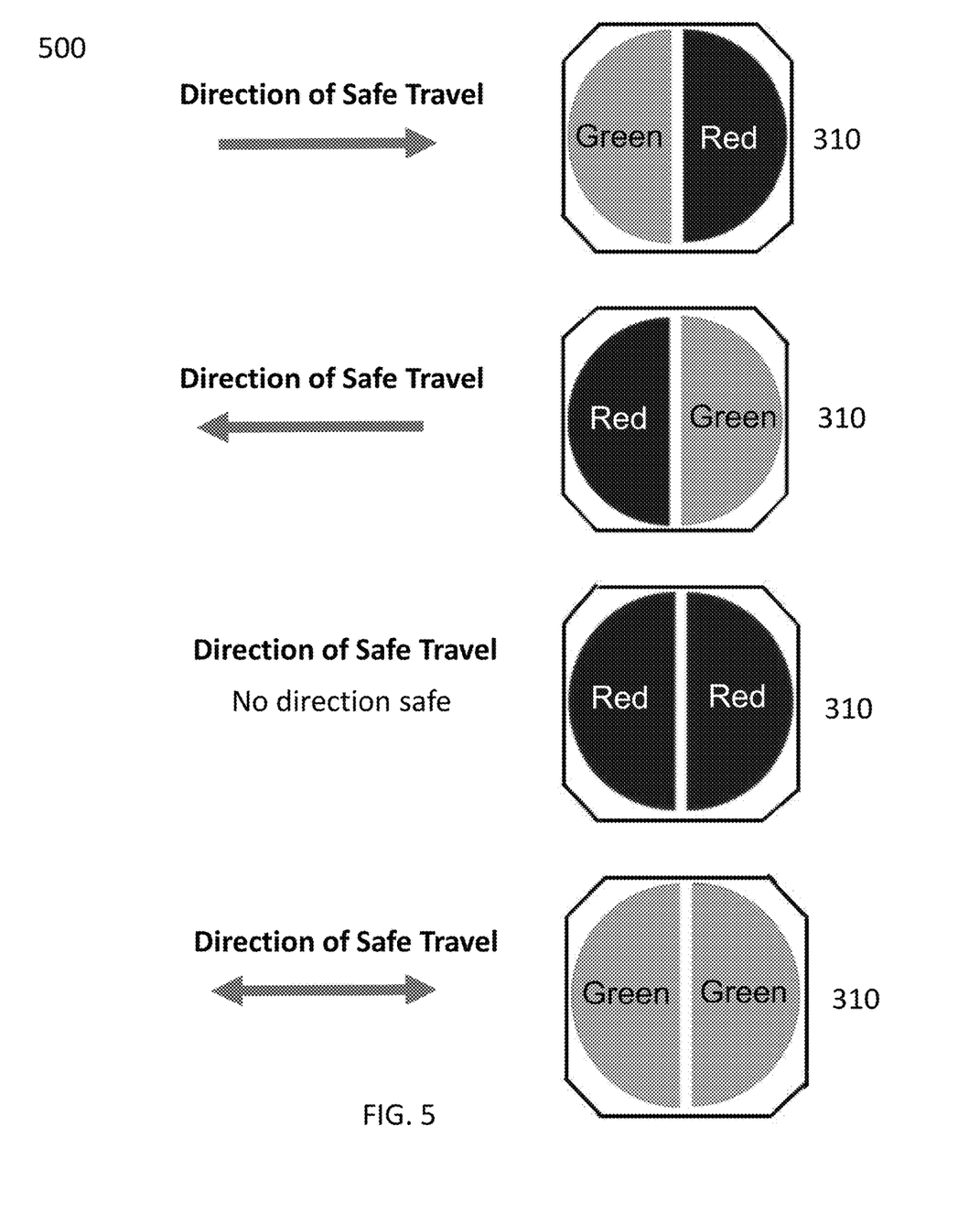
FIG. 5 shows an illustration of exemplary multi-directional semaphores.

FIG. 5. is an illustration showing four possible side views of exemplary multi-directional semaphores 310. The green arrows in FIG. 5 show the direction of safe travel from a viewer perspective, where the viewer only sees one side of the multi-directional semaphore at a time.

Monetization

Embodiments of the systems 100, 300 and 400 and as described are ideal for use in schools, office buildings, hospitals, government offices, and just about anywhere where public safety is a concern.

Secure Architecture

Network security is a concern, especially as more and more devices are connected to the Internet. The preferred embodiment of the invention has security protocols built in. Every device that is part of the invention is configured to perform a self-exam spaced by configurable time intervals. The device is configured to perform a comparison between current parameters and pre-defined acceptable parameters and, if anything is amiss, the device will report the issues and take corrective actions including removing any local malware.

World-Wide Control

Embodiments of the invention include devices configured with network communication hardware and protocols as described above. The devices may thusly be configured to communicate wirelessly, through the internet, to a secure server maintained in a location remote to the device. Through a specially configured computing device, a user may remotely access and interact with one or more of their system devices, from anywhere in the world through the secure server. In this way, a user may operate and monitor a device or an entire system from anywhere in the world.

Computer System

Throughout the description herein, an embodiment of the invention is illustrated with aspects of the invention embodied solely on a specially programmed computer system. As will be appreciated by those of ordinary skill in the art, aspects of the invention may be distributed amongst one or more specially programmed computing devices, which interact with the computer system via one or more data networks such as, for example, the Internet. However, for ease of understanding, aspects of the invention have been embodied in a single computing device.

A specially programmed (or special purpose) computer system includes inter alia a processing device, which communicates with an input/output subsystem, memory, and storage. The processor device is operably coupled with a communication infrastructure (e.g., a communications bus, cross-over bar, or network). The processor device may be a special purpose microprocessor, or a general-purpose processor specifically configured for operating under control of computer program instructions executed from memory on program data, thereby becoming a specially programmed processor. The processor may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general-purpose integrated circuit microprocessor, or each sub-processor may have its own special purpose processor for executing instructions. Alternatively, some or all of the sub-processors may be implemented in an ASIC. RAM may be embodied in one or more memory chips.

The memory may be partitioned or otherwise mapped to reflect the boundaries of the various memory subcomponents. Memory may include both volatile and persistent memory for the storage of: operational instructions for execution by CPU, data registers, application storage and the like. Memory can include a combination of random access memory (RAM), read only memory (ROM) and persistent memory such as that provided by a hard disk drive in secondary memory. The computer instructions/applications that are stored in memory are executed by processor. The computer instructions/applications and program data can also be stored in hard disk drive for execution by processor device. Certain features described herein may be implemented in many ways known by one skilled in the art. For example, certain features may be implemented as "logic" or a "unit" that performs one or more functions. This logic or unit may include hardware, such as one or more microprocessors, application specific integrated circuits, or field programmable gate arrays, software, or a combination of hardware and software.

Further, in view of many embodiments to which the principles of the invention may be applied, it should be understood that the illustrated embodiments are exemplary embodiments and should not limit the present disclosure. Features and components from one embodiment can be used with other embodiments.

Therefore, while there has been described what is presently considered to be the preferred embodiment, it will be understood by those skilled in the art that other modifications can be made within the spirit of the disclosure. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. A component from one embodiment can be used with another embodiment. It should be understood that the invention is not limited to the embodiment(s) described above, but rather should be interpreted within the full meaning and scope of the disclosure.

The invention claimed is:

1. A system for guiding an occupant away from danger and to safety during an evolving emergency event, the system comprising:
    a one or more semaphore communicating with a one or more detector of an emergency detection system programmed to detect the evolving emergency event and communicate an alert mode status each of the one or more semaphore configured to provide a visual cue to the occupant, the visual cue conveying whether it is safe to proceed through the first entryway, each of the one or more semaphore comprising:
        a housing for affixing the first semaphore to a structure in proximity to a first entryway; and
        a first display on which the visual cue is presented;
    a data communication link between each of the one or more semaphore and one or more detector; and
    a logic subsystem configured to:
        monitor the alert mode status of each of the one or more detector; and
        set the visual cue of each of the one or more semaphore that is communicating with the corresponding one or more detector according to the alert status of the one or more detector;
    whereby, the system guides the occupant away from danger and to safety during an evolving emergency event.

2. The system of claim 1 wherein the first entryway is a structure selected from a group consisting of: a door, a gate, a hallway, a tunnel, and a bridge.

3. The system of claim 1 wherein the first display is a light display.

4. The system of claim 1 wherein at least one of the one or more detector comprises a temperature sensor and an infrared sensor operable to detect heat generated by a firearm, and wherein the emergency event is an active shooter event.

5. The system of claim 4 wherein the one or more detector is further operable to detect hotspots from a fire.

6. The system of claim 1 wherein at least one of the one or more semaphore further comprises an audio component to provide audio instructions.

7. The system of claim 1 wherein at least one of the one or more semaphore is a multi-directional semaphore comprising a plurality of sides and a plurality of displays, each of the plurality of displays disposed on each of the plurality of sides and further operable to simultaneously display same or different visual cues in different directions, wherein the occupant sees only one of the plurality of displays of the multi-directional semaphore at one time.

8. The system of claim 1 further comprising a plurality of semaphores signaling a path to safety, wherein the plurality of semaphores interface with the emergency detection system via a data communication link such that detection of the emergency event in the first location determines the visual cue provided by each of the plurality of semaphores, whereby a combination of the visual cues from the plurality of semaphores marks the path to safety.

9. The system of claim 8 wherein the plurality of semaphores comprise logic and communications subsystems permitting the plurality of semaphores to communicate with each other to coordinate the visual cues.

10. The system of claim 8 further comprising an interface with a third-party device selected from a group consisting of: cameras, video cameras, fire sprinklers, and alarms.

* * * * *